United States Patent Office 3,231,385
Patented Jan. 25, 1966

3,231,385
DAIRY PRODUCTS
Suzuoki Ziro, Higashinada-ku, Kobe, Akira Kobata, Toyonaka, Osaka, and Katsuharu Yasumatsu, Ikeda, Osaka, Japan, assignors to Takeda Chemical Industries, Ltd., Osaka, Japan
No Drawing. Filed Dec. 27, 1961, Ser. No. 162,568
Claims priority, application Japan, Dec. 29, 1960, 35/51,690
9 Claims. (Cl. 99—54)

This invention relates to an improvement in dairy products, more particularly a method for preparing cow's milk which is similar to human milk or products prepared therefrom.

Cow's milk is one of the infant's foods being usually employed as a substitute for human milk. The cow's milk is used not only as fresh milk in liquid form but also as processed milk such as condensed milk, milk powder and fermented milk. Cow's milk is, however, composed of not necessarily the same ingredients as those of human milk. Therefore, cow's milk can hardly be called a complete substitute for human milk.

Human milk has so far been considered as a complete foodstuff comprising almost sufficient nutritious components, and therefore it has often been used as a standard for the measurement of nutritive value of foodstuffs. For, infants usually grow remarkably well with only human milk given for several months. This is why human milk is regarded as a complete foodstuff.

Recent increases of women who do not like to nurse their own infants with their own milk for various reasons have made it more usual to nurse infants with cow's milk instead. But, as mentioned above, cow's milk is not a complete substitute for human milk in its nutrient source for infants. Such being the circumstances, there have been many attempts to make a human milk-like product from cow's milk. In these attempts, the most important problem is how to minimize difference between cow's milk and human milk in various components. Namely, differences between human milk and cow's milk in protein, fat, lactose, mineral substances, vitamins, bifidus factor, etc. in respect to their quantity, quality and content are to be minimized to the extent possible. For minimizing these differences, enrichment of cow's milk with whey proteins, vitamin F, β-lactose, etc. has been investigated and practised in recent years.

On the other hand, in the field of biochemistry, attention has recently been drawn to nucleic acid as a fundamental substance in life. In the course of the present inventors' study, various interesting facts have been found. Namely, there is a distinguishing difference in distribution of nucleic acid components between human milk and cow's milk. This fact was clarified by the present inventors' comparative study on acid soluble fractions of both milks. An example of the study is shown in the following table:

TABLE

| Nucleotides* | Human milk (μg percent) | Cow's milk (μg percent) |
|---|---|---|
| Cytidine 5'-diphosphate choline (CDP-Choline) | Trace | Trace |
| Cytidine 5'-monophosphate (CMP) | 1,680–1,800 | 297 |
| Adenosine 5'-monophosphate (AMP) | 90 | |
| 3',5'-Adenosine cyclic monophosphate-(3',5'-AMP) | 21–24 | 138 |
| Guanosine 5'-monophosphate (GMP) | 27–53 | |
| Uridine 5'-monophosphate (UMP) | 114–133 | |
| Uridine 5'-diphosphate N-acetyl-lactosamine (UX1) | 11 | |
| Uridine 5'-diphosphate N-acetyl-lactosamine fucose (UX3) | 160 | |
| Guanosine 5'-diphosphate mannose (GDPM) | 67–91 | |
| Uridine 5'-diphosphate N-acetyl glucosamine plus Uridine 5-diphosphate N-acetylgalactosamine (UDP-AG+UDP-AGal) | 260–361 | |
| Uridine 5'-diphosphate glucose plus Uridine 5'-diphosphate galactose (UDPG+UDP-Gal) | 67–84 | |
| Guanosine 5'-diphosphate (GDP) | 34 | |
| Uridine 5'-diphsophate glucuronic acid plus Uridine 5'-diphosphate (UDPGA+UDP) | 127–218 | |
| Orotic acid | | 6,190 |

* (a) The nucleotides will be referred to hereinafter by the respective abbreviations shown in parentheses. (b) In human milk, there still can be found other kinds of nucleotide fractions, though they have not yet been identified.

As is clear from the above table, there are present numerous kinds of nucleotides in human milk, while most of the nucleotide fractions found in cow's milk is present as orotic acid which is regarded as a precursor of nucleic acid. It is interesting that such a remarkable difference is found between human milk and cow's milk in distribution of nucleic acid constituents, which are considered as a source of infant's nutrients.

Among these nucleotide fractions, UDP–AG, UX1 and UX3 can be found in human milk, which is also noteworthy. These nucleotide fractions have both UDP and various sugars, the later being known as the "bifidus factor" and are found in human milk. That is, the so-called "bifidus factor" is found in mother's milk in combined form with UDP. The "bifidus factor" causes a predominant occurrence of *Lactobacillus bifidus* in the intestinal tract of breast-fed infants, and therefore it is very important factor in protecting infants from bacterial intestinal diseases.

In the past nucleotides have been relatively unavailable, but they are now becoming easily obtainable as the result of improvements in microbiological or organic chemistry.

Namely, 5'-nucleotides may be industrially produced by the hydrolysis of nucleic acid by an enzyme system, e.g. microorganisms.

Combination of the aforesaid findings with the ready availability of 5'-nucleotides has led the present inventors to consider that the cow's milk can be converted into human milk-like product by the addition of nucleotides which are present in human milk but not in cow's milk. But, it has further been found by the present inventors that nucleotides are very unstable in cow's milk owing to the presence of phosphatases, e.g. phosphomonoestearse and pyrophosphatase, which catalyze the hydrolysis of nucleotides into nucleosides. And, the present inventors have found that the phosphatase can be inactivated without destroying total nutrients in cow's milk.

The present inventors have further discovered that if the nucleotide fractions which are present in human milk are added to cow's milk, the taste of the thus obtained milk is so improved that even infants who will not drink cow's milk will willingly drink the cow's milk to which the aforementioned nucleotide fractions have been added.

Further investigation on the behavior of cow's milk, to which the aforementioned nucleotide fractions have been added, have been conducted, and it was found that the curd tension of cow's milk is considerably lowered by the addition of the nucleotides so that the digestibility of cow's milk is raised.

The present invention is based on the aforementioned findings; however, it is pointed out that the addition of the nucleotides should be effected just before or simultaneously with or after the inactivation of phosphatases in non-processed or processed cow's milk.

The object of this invention is to provide dairy product which has human milk like constituents. The object is realized by the addition to cow's milk or dairy products of nucleotides which are present in human milk but substantially absent in cow's milk.

Nucleotides present in human milk but substantially absent in cow's milk are, as noted previously, AMP, GMP, UMP, GDP, GPDM, UDPG, UDP-Gal, UDP-GA, UX1, UX3 and UDP-AG. Other than these, CMP is present in cow's milk far less than in human milk. Therefore CMP should also be included in nucleotides present in human milk but substantially absent in cow's milk.

These nucleotides can be classified into two groups, one of which is 5'-nucleotides and the other is, though they fall also into the scope of 5'-nucleotides, sugar esters of 5'-nucleotides.

The compounds of the first group are 5'-nucleotides, and can be prepared by hydrolysis of nucleic acid which can be extracted from living tissues, such as microorganisms (e.g. yeast) and animal tissues. The hydrolysis may be effected by the action of an enzyme system produced by microorganisms or an enzyme system from snake venom or from a bovine's small intenstine. But, as the latter two enzyme systems are not industrially available, it is recommendable to employ an enzyme system of microorganisms. The enzyme system is widely distributed among many species of microorganisms, e.g. *Streptomyces griseus, Streptomyces flavus, Streptomyces aureus, Streptomyces lavendulae, Fusarium roseum, Helminthosporium sigmoideum, Bacillus brevis, Bacillus subtilis, Anixella cingulata, Botriosphaeria ribis chromogena, Glomerella cingulata and Sordaria fimicola.* In other words, the enzyme system is produced from microorganisms belonging to Actinomycetes, Fungi Imperfecti, Bacteria, and so on. The enzyme system may be in the form of a culture filtrate, cell suspension or extracted enzyme. Or, the hydrolysis may be conducted in such a manner that the microorganism is incubated in a nutrient medium to which nucleic acid is added. As the enzyme system contains, in most cases, phosphatase which acts on nucleotides to hydrolyze them into the corresponding nucleosides, a phosphatase inhibitor such as arsenates or phosphates or cyanates should be added to the reaction mixture. Or, the phosphatases may be inactivated by the aid of phenol, etc.

The actual hydrolysis may be conducted in a per se known manner utilizing an enzyme system of microorganisms. For example, the hydrolysis is conducted at 20 to 30° C. for 2 to 5 days. The hydrolyzate thus obtained contains various kinds of 5'-nucleotides, e.g. UMP, GMP, CMP, AMP and sometimes inosine 5'-monophosphate (IMP) which is converted from AMP through deamination by AMP-deaminase which is also present in the enzyme system. From the hydrolyzate, UMP, GMP, AMP and CMP which are present in human milk but substantially absent in cow's milk can be isolated in a conventional manner, that is, the isolation may be conducted by column chromatography on e.g. activated charcoal and ion exchange resin. The ion exchange resin may be weakly acid or weakly basic. Thus, GMP, UMP, CMP and AMP are easily collected. And, by phosphorylation of GMP and UMP, GDP and UDP are respectively synthesized. Some of the other nucleotide fractions, e.g. UDP-GA and GDPM, may chemically be synthesized starting from the afore-mentioned monophosphates. In such a way as this, most of the nucleotide fractions which are present in human milk but substantially absent in cow's milk are prepared.

Thus, the preparation of cow's milk which is similar to human milk is effected by addition to cow's milk of the nucleotide fractions which are present in human milk but substantially absent in cow's milk. Though the nucleotide fractions may be added as such, it is more conventional to add nucleotides in the form of an alkali salt, e.g. sodium salt, potassium salt and salt with a basic amino acid such as histidine, avoiding possible coagulation of cow's milk sometimes caused by acidity of nucleotides.

As described above, cow's milk contains phosphatases capable of hydrolyzing nucleotides into the corresponding nucleosides. Therefore, phosphatases should be inactivated or destroyed just after or simultaneously with or before the addition of the nucleotide fractions. Though the inactivation or destruction of phosphatases may be effected by the addition of a phosphatase-inhibitor (e.g. arsenates, phosphates or cyanates), most of them are unsuitable as an additive to infants' food, and therefore the inactivation or destruction by a phosphatase-inhibitor is undesirable.

It has been found that phosphatases are sufficiently inactivated by simply heating for a short time, e.g. at 60° C. for 40 minutes, at 65° C. for 20 minutes, at 70° C. for 5 minutes, at 75° C. for 40 seconds or at 80° C. for only one second. Therefore, the inactivation may conveniently be effected by heating for a short time. Such a short heating does not affect the natural flavour or taste of cow's milk, and also there is no fear of contamination by unfavorable substances in the product.

When cow's milk is marketed, it is generally necessary to pasteurize or sterilize it to avoid undesirable infections caused by infectious microorganisms which may be present in the milk. The heating is usually effected at 65° for over 30 minutes or 75° for over 15 minutes. Therefore, the addition of nucleotide fractions to cow's milk may be conducted just before or simultaneous with or after the heating process, so that the phosphatase in cow's milk is inactivated or destroyed.

When cow's milk is processed into condensed milk or into powdered milk, it is generally passed through a heating process which is necessary for pasteurization or sterilization of milk and for lowering curd tension of milk. Therefore, the nucleotide fractions may preferably be added just before or simultaneously with or after such a heating process. Of course, the nucleotide fractions may be added to the final product. Further, when fermented milk products such as yogurt and lactic acid-containing drinks are processed by the method of the present invention, the nucleotides should be added to the pasteurized final product, because the fermented milk product generally contains microorganisms which may produce phosphatase.

Briefly stated, the addition of nucleotide fractions present in human milk but substantially absent in cow's milk should be effected in the absence of phosphatase or just before the time when phosphatase is inactivated.

GMP, UMP, CMP and other nucleotide fractions may be added to cow's milk so as to make their contents similar to that of human milk. That is to say, to 1 liter of unprocessed cow's milk there is added, about 10 to 20 milligrams (preferably 15 milligrams) of CMP, about 0.2 to 0.4 milligram (preferably 0.3 milligram) of GMP, about 1.2 to 1.4 milligrams (preferably 1.3 milligrams) of UMP, about 0.4 to 0.6 milligram (preferably 0.5 milligram) of GDP and about 1.0 to 3.0 milligrams (preferably 2.0 milligrams) of UDP-GA. Other nucleotide fractions may also be added by taking the difference between cow's milk and human milk in their nucleotides content into consideration. For example, about 0.5 to 1.0 milligram of UDPG and about 0.5 to 1.0 milligram of UDP may be added to 1 liter of unprocessed cow's milk.

The above mentioned ratio of nucleotide fractions which are added to cow's milk may of course be changed in accordance with the nucleotide content of the particular cow's milk to be processed.

The nucleotides may be added in a single batch to the unprocessed cow's milk, but there is a danger that the thus-obtained product may not be a homogeneous mixture. If such is the case, the nucleotide fractions to be added are first dissolved in a smaller portion of pasteurized cow's milk, then the mixture is further added to that remaining cow's milk.

When the nucleotide fractions are added to condensed or powdered milk, the nucleotides are added in sufficient amounts so that when said milk is diluted, the amount of nucleotides present is about equal to the amount present in human milk. In such a case, the addition may be conducted before or simultaneously with or after concentrating or spray-drying the milk. The product may contain sugars, soluble carbohydrates, minerals, vitamins, amino acids, etc. For example, sucrose, β-lactose, vitamin F, vitamin A, vitamin D, L-lysine, L-methionine may be added to enrich the product. The afore-said addition may of course be conducted before or simultaneously with or after the addition of the nucleotides. If desired, the milk material or the product may be homogenized by a conventional manner. Though the nucleotides to be added are those present in human milk but substantially absent in cow's milk, all of such nuleotides may not be added if some of them are not readily available. For example, even if UDP, UDPG, UDP-AG, UX1 and UX3 are not added, the infants' taste for the processed cow's milk of this invention is markedly improved in comparison with that of unprocessed cow's milk. In fact, the various nucleotides to be added to the cow's milk are restricted in view of their availability. Therefore, the present inventors have investigated whether infants' taste for the cow's milk of this invention is affected when some of the more easily attainable nucleotides are added to cow's milk, and found that the infants' taste for cow's milk can be improved by the addition of only AMP, GMP, UMP and CMP, all of which are easily available by the hydrolysis of nucleic aid.

The cow's milk processed as above may be further processed to a secondary product only when the secondary process does not require the use of microorganisms capable of producing phosphatases. For example, the milk processed in accordance with the present invention may be further processed into ice-cream or the like. If it is desired to add nucleotides present in human milk but substantially absent in cow's milk to fermented milk products, the nucleotides should be added just before or simultaneously with or after pasteurization of the product.

Another method for the addition of nucleotides present in human milk but substantially absent in cow's milk is to first prepare a composition containing such nucleotides and then to add the so-prepared composition to unprocessed or processed cow's milk. An object of this invention lies in the preparation of such a composition. The object is realized by admixing the nucleotides with soluble or dispersible carbohydrate.

The carbohydrates that may be used are, for example, α-lactose, β-lactose, balanced lactose, sucrose, maltose, dextrin, pre-gelatinized cereal powder and gruel powder. Through raw cereal grains contain some phosphatase, it may be inactivated by heating or boiling which produces pre-gelatinized cereal powder. Therefore, the nucleotides can be added to such a carbohydrate without any fear of the phosphatase. But, if there are phosphatases present in the carbohydrate, the nucleotides may be added just before or simultaneously with or after inactivation of all the phosphatases contained therein. The nucleotides are added to the carbohydrates in an amount sufficient to bring the concentration of the milk to which the so-formed additive is added equal to the concentration of nucleotides in human milk. For example, each of CMP, GMP, UMP, GDP and UDP in 1 kilogram of the composition may be 0.2 to 0.3 gram, 5 to 6 grams, 0.02 to 0.03 gram, 0.008 to 0.01 gram, 0.03 to 0.4 gram, respectively. To unprocessed milk, about 4 to about 7 percent by weight of such a composition may preferably by added. The composition may also contain minerals, vitamins, amino acids or the like to enhance the nutritious value of the so-prepared cow's milk.

As afore-described, the infants' taste for cow's milk is sufficiently improved by the addition of only AMP, GMP, UMP and CMP which are the most available nucleotides. Therefore, these easily available nucleotides may be prepared in an easily usable composition. Namely, they may be prepared in powder or tablet form, which contain a constant quantity of these nucleotides, to avoid weighing before the addition. The nucleotides to be prepared in the composition are of course not restricted to only AMP, GMP, UMP and CMP, but may include other nucleotide fractions. The composition may contain also such excipients or carriers as lactose (α- or balanced), soluble starch and other soluble or dispersible carbohydrates so long as they have no toxicity.

Though the amount of the respective nucleotides in the composition may be determined by taking the molar ratio of base components of nucleotide fractions in human milk into consideration, the composition may preferably be prepared so as to make the ratio of AMP, GMP, UMP and CMP 1.5–2.0:1.0–1.5:6.5–7:20 by weight. The preparation may be dissolved in about 25–30 milligrams per liter of cow's milk.

The composition may, if desired, be used by dissolving in a small portion of water or pasteurized cow's milk, followed by the addition of the solution to the cow's milk. Also, the composition may contain minerals, vitamins, amino acids or the like to enhance the nutrient value of the so-prepared milk.

Another feature of the present invention is to add nucleotides present in human milk but substantially absent in cow's milk to so-called baby foods.

The nucleotides may be added to baby foods such as, strained food, chopped food and powdery food prepared from egg-yolk, liver, chicken, animal meat, fish meat, vegetables, fruits, custard, and so on. In such materials, there are generally present phosphatases, therefore in the preparation of such baby foods heating or boiling is necessary. Therefore, the phosphatases are inactivated in the preparation. According to circumstances, the nucleotides should be added just before or simultaneously with or after the heating or boiling process. To one hundred grams of baby foods may be added CMP, GMP, UMP, GDP, UDP-GA in a concentration of 10 to 20 milligrams, 0.2 to 0.4 milligram, 1 to 2 milligrams, 3 to 5 milligrams, 0.4 to 0.6 milligram, 1 to 2 milligrams, respectively. The thus prepared baby foods may be administered to 4 to 6 months old infants in amounts of 10 to 30 grams per meal or to 7 to 12 months old infants in amounts of 60 to 80 grams per meal.

Though the several features of the present invention were shown as above, nucleotides may of course be employed in a pure state or in a crude state in all cases afore described. For example, the hydrolyzate of nucleic acid may be used as such only after the toxic components and components having unpleasant taste or odor are removed. The removement may most simply be effected by allowing the hydrolyzate to pass over a column of ion-exchange resin or of activated charcoal. As the ion-exchange resin, there may be used weakly acid cation exchange resin or weakly basic anion exchange resin. The crude nucleotide mixture thus prepared contains various nucleotides other than those present in human milk, but these do not affect the taste or flavour of the product nor the nutritive value. When the crude nucleotide mixture is employed, it is difficult to add each nucleotide in proper quantities, but it may be possible at least to make the cow's milk to which is added crude nucleotides mixture resemble human milk. The quantity to be added of such a crude nucleotide mixture may be determined by referring to the analytical value of the mixture of the nucleotide contents therein.

Cow's milk contains 3',5'-AMP in larger quantities than human milk and also contains orotic acid which is absent in human milk. These nucleotides remain in the prepared milk of the present invention, but these do not effect the nutritive value or have a harmful effect on the infants. The operation of the invention is illustrated by the following examples, but they are illustrative only and do not at all limit the scope of the invention. All percentages in the examples are in weight percent. Numbers attached to respective names of microorganisms are accession numbers of the microorganisms at American Type Culture Collection, Washington, D.C., U.S.A. In these examples, nucleotides are all used in the form of their disodium salt, but they may be substituted for by other salts, e.g. the corresponding potassium salt and ammonium salt, or by the free nucleotides, if desired.

*Example 1*

To 600 liters of raw cow's milk are added 10 kilograms of β-lactose, 9.5 kilograms of soluble polysaccharide, 10 kilograms of sucrose and an adequate portions of minerals. Then the mixture is boiled and condensed to about 200 liters. To the condensate are dissolved 9 grams of disodium CMP, 180 milligrams of disodium GMP, 900 milligrams of disodium UMP, 300 milligrams of disodium GDP and 1.2 grams of sodium salt of UDP-GA. The mixture is spray-dried, then sucrose and β-lactose are added to make the whole weight 100 kilograms. The product may be canned with nitrogen gas substituted for air.

*Example 2*

20 kilograms of β-lactose are homogeneously admixed with 9 grams of disodium CMP, 180 milligrams of disodium UMP, 300 milligrams of disodium GDP, 1.2 grams of sodium salt of UDP-GA. The mixture is added to 80 kilograms of a prepared cow's milk powder to which sucrose, soluble polysaccharide and various minerals have been added in a conventional manner. The mixture is well admixed to make the product homogenous. The product may be canned with nitrogen gas substituted for air.

*Example 3*

Into 50 milliliters of pasteurized cow's milk are dissolved 1.4 grams of disodium CMP, 30 milligrams of disodium GMP, 130 milligrams of disodium UMP, 200 milligrams of sodium salt of UDP-GA. The solution is constantly poured into a stream of cow's milk being added continuously into a pasteurizer at a constant rate. The ratio is adjusted so that 50 milliliters of the solution prepared as above is added to 100 liters of cow's milk. The pasteurization may be at 91° C. for 2 seconds. The product may be filled into bottles.

*Example 4*

To 100 liters of pasteurized cow's milk is aseptically added a solution of nucleotides whose component is the same as that used in Example 3. The product may be filled into bottles.

*Example 5*

To 600 liters of raw cow's milk are added 10 kilograms of balanced lactose, 9.5 grams of soluble polysaccharides, 10 kilograms of sucrose. The mixture is boiled and condensed under reduced pressure.

One kilogram of dried torula yeast is extracted with alkaline saline solution (pH 8.0) at 90° C. for 4 hours, and the extract is centrifuged to remove solid matters. To 150 liters of the yeast extract is added 50 liters of culture filtrate of *Streptomyces griseus* (ATCC–10137), the mixture being allowed to stand at 40° C. for 15 hours. The reactant is filtered by the aid of filter-aid (diatomaceous earth), and the filtrate is passed through a column packed with carboxylic acid resin (polymer bead resin, acrylic type, commercialized under the trade name of Amberlite IRC–50). The eluent is concentrated under reduced pressure to obtain nucleotides-containing concentrate.

The concentrate is admixed with the afore-prepared cow's milk concentrate, then is spray-dried. To the prepared powder, β-lactose is added to make the whole weight 100 kilograms. The product may be canned with nitrogen gas substituted for air.

*Example 6*

After standardizing the constituency of 600 liters of raw cow's milk, 10 kilograms of β-lactose and soluble polysaccharide is added to the milk and is boiled.

To a little quantity of pasteurized cow's milk are added 180 micrograms of disodium GMP, 550 micrograms of disodium AMP, 800 micrograms of disodium UMP, 300 micrograms of disodium GDP and 1.2 grams of UDP–GA. The solution is added to the afore-prepared milk, then is condensed followed by spray-drying. To the powdery product, an adequate quantity of vitamin, amino acids, etc. are added to make the whole weight 100 kilograms.

*Example 7*

To 100 kilograms of a prepared cow's milk powder which contains β-lactose, sucrose, nutrient sugar and minerals, there are added 9 grams of disodium CMP, 180 micrograms of disodium GMP, 550 micrograms of disodium AMP and 4 grams of disodium UMP. The mixture is well admixed and screened to prepare a processed powdered milk.

*Example 8*

A mixture composed of 600 liters of raw cow's milk and 10 kilograms of sucrose is boiled and condensed.

On the other hand, ribonucleic acid in yeast extract is hydrolyzed in the same manner as in Example 5, then AMP and GMP are separated in a conventional manner to leave a mother liquor containing CMP and UMP.

The mother liquor is added to the afore-prepared milk condensate, the volume of the mother liquor corresponding to 8 grams each of CMP and UMP. To the mixture, there is further added 500 grams of sodium dibasic phosphate, and then is spray-dried. To the product is added 20 kilograms of β-lactose to obtain 100 kilograms of powdered prepared milk.

*Example 9*

In a culture tank, *Streptomyces aureus* (ATCC–13404) is incubated at 28° C. for 2 to 3 days in a nutrient medium of pH 7.0 composed of soluble starch (4%), peptone (1%), meat extract (1%), dried yeast (0.2%), potassium dibasic phosphate (0.1%), sodium chloride (0.5%) (these percentages are in weight by volume percent). The culture filtrate is adjusted to pH 4.0, then is heated at 50° C. for 1 minute, then immediately adjusted to pH 7.0. To 25 liters of this yeast solution, there is added 10 kilograms of dried yeast plus 20 liters of water to suspend the yeast, then the pH of the suspension is adjusted to pH 8.0. The suspension is kept standing for 16 hours at 37° C., followed by removing the cells by centrifugation or filtration. The thus prepared nucleotide-containing solution is passed through a column packed with activated charcoal followed by fractional elution of the nucleotide fractions containing respectively UMP, CMP, GMP and AMP. Each of the fractions is neutralized with sodium hydroxide solution and is concentrated to obtain the respective disodium salts.

On the other hand, a mixture composed of raw cow's milk, sucrose, β-lactose and minerals is boiled, condensed under reduced pressure and spray-dried. To 20 kilograms of β-lactose, there are added disodium CMP, disodium GMP, disodium UMP, disodium AMP, GDP and UDP-GA whose respective weights are 9 grams, 180 milligrams, 900 milligrams, 500 milligrams, 300 milligrams and 1.2 grams, then they are admixed homogeneously. The homogeneous mixture of 80 kilograms of the afore-prepared powdered milk and 20-kilograms of the above mixture of β-lactose and nucleotides is processed powdered cow's milk similar to human milk.

*Example 10*

A ribonucleic acid-containing aqueous extract of torula yeast is hydrolyzed by employing a culture filtrate of *Streptomyces coelicolor* (ATCC–13405) obtain a solution composed of nucleotides mixture. The nucleotide mixed solution is concentrated, then is neutrarized with a sodium hydroxide solution to make the nucleotide disodium salt, followed by further concentration to dryness.

To 50 milliliters of a pasteurized cow's milk, there is added 2 to 3 grams of the afore-prepared disodium salt mixture of nucleotides. To 100 liters of cow's milk flown into flash pasteurized, the above prepared milk solution of nucleotides mixture is added. The processed milk flown out from the pasteurizer may be bottled.

*Example 11*

A ribonucleic acid-containing aqueous extract of torula yeast is hydrolyzed by the aid of a culture filtrate of *Streptomyces aureus* (ATCC–13404). The hydrolyzate is passed through a column packed with carboxylic acid resin (polymer bead resin, acrylic type, marketed under the trade name Amberlite IRC–50) to remove components having toxicity and/or unpleasant taste or odor, then is neutralized with an aqueous solution of sodium hydroxide, followed by concentration.

After making its composition standard, 600 liters of raw cow's milk is enriched with 10 kilograms of β-lactose, 10 kilograms of sucrose and 9.5 kilograms of soluble polysaccharide, followed by boiling. To the processed cow's milk, there is added the afore-prepared nucleotide solution whose volume corresponds to 10 to 15 grams of nucleotides. The mixture is concentrated to dryness, then an adequate amount of vitamins and amino acids are preferably admixed to prepare 100 kilograms of processed milk powder.

*Example 12*

A ribonucleic acid-containing aqueous extract of torula yeast is hydrolyzed by the aid of a culture filtrate of *Bacillus brevis* (ATCC–8185). To 100 liters of milk which has already been standardized and boiled, there is added a concentrate of the afore-prepared hydrolyzate of yeast, whose volume corresponds to 2 to 3 grams of nucleotides. The mixture is condensed, homogenized, canned, then pasteurized to obtain 100 liters of condensed milk.

*Example 13*

A ribonucleic acid-containing aqueous extract of torula yeast is hydrolyzed by the aid of a culture filtrate of *Anixiella reticulispora* (ATCC–13828), followed by the treatment with ion-exchange resin to obtain a non-toxis nucleotide solution. To the solution, there is added methanol to obtain a solution mainly containing UMP and CMP, and the solvent is distilled off.

One hundred liters of cow's milk is filtered and homogenized. To the cow's milk the afore-prepared nucleotide mixture is added, followed by being spray-dried.

*Example 14*

A mixture of white rice powder and about 10 times its volume of water is kneaded, then is boiled for 30 minutes to gelatinize the starch in the rice, followed by filtration. To the filtrate are added the respective disodium salts of CMP, GMP, UMP, GDP and UDP-GA whose respective ratios are 27 grams, 540 milligrams, 2.7 grams, 900 milligrams and 3.6 grams relative to 100 kilograms of final product. Then the mixture is spray-dried to prepare an additive for milk products.

*Example 15*

With alkaline saline solution (pH 8.0), 1 kilogram of yeast is extracted for 4 hours at 90° C., then is centrifuged to remove solid matters. A culture filtrate of *Streptomyces griseus* (ATCC–10137) is added to the filtrate, and is kept standing at 40° C. for 15 hours to hydrolyze ribonucleic acid. The total hydrolyzate is passed through a tower packed with carboxylic acid resin (polystyrene bead resin, acrylic type, commerciallized e.g. under the trade name Amberlite IRC–50), then the eluent is concentrated to obtain a concentrated solution of various nucleotides.

A mixture of white rice powder and about 10 times its volume of water is kneaded, then is boiled for 30 minutes to gelatinize the starch in rice, followed by filtration.

To the filtrate, the whole volume of the afore-prepared nucleotide solution is admixed, the ratio between filtrate and nucleotide solution being the whole volume of the formed relative to 10 kilograms of the final product to be prepared. The mixture is spray-dried to prepare gelatinized cereal powder to be used as an additive for a milk product.

*Example 16*

White rice powder is suspended in water so as to make the content of solid matter about 30%.

To the suspension, there is added a concentrated solution of various nucleotides prepared in the same manner as in Example 15 in a constant ratio, just before the suspension is placed in drum dryer. The mixing ratio is the volume of nucleotide solution per 30 kilograms of the suspension. The suspension is gelatinized in the drum simultaneously with the drying process. This product may be used as an additive for milk products.

*Example 17*

Orange juice and apple juice are admixed with each other, and to the mixture is added an adequate quantity of sugar. The mixture is agitated at 80° C. for 5 minutes. To 100 grams of the mixed juice are added 15 milligrams of disodium CMP, 300 micrograms of disodium GMP and 1.5 milligrams of disodium UMP. Then the mixture is strained, canned and sterilized.

*Example 18*

| Composition of tablets: | Milligrams per tablet |
|---|---|
| Disodium AMP | 1.72 |
| Disodium GMP | 1.26 |
| Disodium UMP | 6.62 |
| Disodium CMP | 20.50 |
| β-Lactose | 169.90 |
| Total | 200.00 |

The above composition is made into tablets in a conventional manner. One tablet is dissolved, before admixing with cow's milk, into about 5 milliliters of warmed water. To 1 liter of unprocessed or processed cow's milk or a solution of milk powder, the thus prepared solution of the tablet of this example is dissolved to make a processed cow's milk.

Having thus disclosed the invention, what is claimed is:

1. An active phosphatase free cow's milk which contains at least two of the respective disodium salts of (a) cytidine 5'-monophosphate in the amount of 10 to 20 milligrams per liter of cow's milk, (b) guanosine 5'-monophosphate in the amount of 0.2 to 0.4 milligram per liter of cow's milk, (c) uridine 5'-monophosphate in the amount of 1.2 to 1.4 milligrams per liter of cow's milk, (d) guanosine 5'-diphosphate in the amount of 0.4 to 0.6 milligram per liter of cow's milk, (e) uridine 5'-diphosphate glucose in the amount of 0.5 to 1.0 milligram per liter of cow's milk, (f) uridine 5'-diphosphate galactose in the amount of 0.5 to 1.0 milligram per liter of cow's milk and (g) uridine 5'-diphosphate glucuronic acid in the amount of 1.0 to 3.0 milligrams per liter of cow's milk.

2. An active phosphatase free cow's milk product selected from the group consisting of raw milk, sterilized-fluid milk, powdered milk, and concentrated milk, which contain at least two nucleotides selected from the group consisting of (a) cytidine 5'-monophosphate in the amount of 10 to 20 milligrams per liter of cow's milk, (b) guanosine 5'-monophosphate in the amount of 0.2 to 0.4 milligram per liter of cow's milk, (c) uridine 5'-monophosphate in the amount of 1.2 to 1.4 milligrams per liter of cow's milk, (d) guanosine 5'-diphosphate in the amount of 0.4 to 0.6 milligram per liter of cow's milk, (e) uridine 5'-diphosphate glucose in the amount of 0.5 to 1.0 milligram per liter of cow's milk, (f) uridine 5'-diphosphate galactose in the amount of 0.5 to 1.0 milligram per liter of cow's milk and (g) uridine 5'-diphosphate glucuronic acid.

3. An active phosphatase free cow's milk product selected from the group consisting of raw milk, sterilized-fluid milk, powdered milk, and concentrated milk, which contain the salts of at least two nucleotides selected from the group consisting of (a) cytidine 5'-monophosphate in the amount of 10 to 20 milligrams per liter of cow's milk, (b) guanosine 5'-monophosphate in the amount of 0.2 to 0.4 milligram per liter of cow's milk, (c) uridine 5'-monophosphate in the amount of 1.2 to 1.4 milligrams per liter of cow's milk, (d) guanosine 5'-diphosphate in the amount of 0.4 to 0.6 milligram per liter of cow's milk, (e) uridine 5'-diphosphate glucose in the amount of 0.5 to 1.0 milligram per liter of cow's milk, (f) uridine 5'-diphosphate galactose in the amount of 0.5 to 1.0 milligram per liter of cow's milk and (g) uridine 5'-diphosphate glucuronic acid, said salts being selected from the group consisting of the disodium salt, the dipotassium salt and the diammonium salt.

4. Active phosphatase free cow's milk which contains at least two nucleotides selected from the group consisting of (a) cytidine 5'-monophosphate in the amount of 10 to 20 milligrams per liter of cow's milk, (b) guanosine 5'-monophosphate in the amount of 0.2 to 0.4 milligram per liter of cow's milk, (c) uridine 5'-monophosphate in the amount of 1.2 to 1.4 milligrams per liter of cow's milk, (d) guanosine 5'-diphosphate in the amount of 0.4 to 0.6 milligram per liter of cow's milk, (e) uridine 5'-diphosphate glucose in the amount of 0.5 to 1.0 milligram per liter of cow's milk, (f) uridine 5'-diphosphate galactose in the amount of 0.5 to 1.0 milligram per liter of cow's milk and (g) uridine 5'-diphosphate glucuronic acid.

5. Active phosphatase free cow's milk which contains the salts of at least two nucleotides selected from the group consisting of (a) cytidine 5'-monophosphate in the amount of 10 to 20 milligrams per liter of cow's milk, (b) guanosine 5'-monophosphate in the amount of 0.2 to 0.4 milligram per liter of cow's milk, (c) uridine 5'-monophosphate in the amount of 1.2 to 1.4 milligrams per liter of cow's milk, (d) guanosine 5'-diphosphate in the amount of 0.4 to 0.6 milligram per liter of cow's milk, (e) uridine 5'-diphosphate glucose in the amount of 0.5 to 1.0 milligram per liter of cow's milk, (f) uridine 5'-diphosphate galactose in the amount of 0.5 to 1.0 milligram per liter of cow's milk and (g) uridine 5'-diphosphate glucuronic acid, said salts being selected from the group consisting of the disodium salt, the dipotassium salt and the diammonium salt.

6. Active phosphatase free powdered cow's milk containing at least two nucleotides selected from the group consisting of (a) cytidine 5'-monophosphate in the amount of 10 to 20 milligrams per liter of cow's milk, (b) guanosine 5'-monophosphate in the amount of 0.2 to 0.4 milligram per liter of cow's milk, (c) uridine 5'-monophosphate in the amount of 1.2 to 1.4 milligrams per liter of cow's milk, (d) guanosine 5'-diphosphate in the amount of 0.4 to 0.6 milligram per liter of cow's milk, (e) uridine 5'-diphosphate glucose in the amount of 0.5 to 1.0 milligram per liter of cow's milk, (f) uridine 5'-diphosphate galactose in the amount of 0.5 to 1.0 milligram per liter of cow's milk and (g) uridine 5'-diphosphate glucuronic acid.

7. Active phosphatase free powdered cow's milk containing the salt of at least two nucleotides selected from the group consisting of (a) cytidine 5'-monophosphate in the amount of 10 to 20 milligrams per liter of cow's milk, (b) guanosine 5'-monophosphate in the amount of 0.2 to 0.4 milligram per liter of cow's milk, (c) uridine 5'-monophosphate in the amount of 1.2 to 1.4 milligrams per liter of cow's milk, (d) guanosine 5'-diphosphate in the amount of 0.4 to 0.6 milligram per liter of cow's milk, (e) uridine 5'-diphosphate glucose in the amount of 0.5 to 1.0 milligram per liter of cow's milk, (f) uridine 5'-diphosphate galactose in the amount of 0.5 to 1.0 milligram per liter of cow's milk and (g) uridine 5'-diphosphate glucuronic acid.

8. Active phosphatase free condensed cow's milk containing at least two nucleotides selected from the group consisting of (a) cytidine 5'-monophosphate in the amount of 10 to 20 milligrams per liter of cow's milk, (b) guanosine 5'-monophosphate in the amount of 0.2 to 0.4 milligram per liter of cow's milk, (c) uridine 5'-monophosphate in the amount of 1.2 to 1.4 milligrams per liter of cow's milk, (d) guanosine 5'-diphosphate in the amount of 0.4 to 0.6 milligram per liter of cow's milk, (e) uridine 5'-diphosphate glucose in the amount of 0.5 to 1.0 milligram per liter of cow's milk, (f) uridine 5'-diphosphate galactose in the amount of 0.5 to 1.0 milligram per liter of cow's milk and (g) uridine 5'-diphosphate glucuronic acid.

9. Active phosphatase free condensed cow's milk containing the salt of at least two nucleotides selected from the group consisting of (a) cytidine 5'monophosphate in the amount of 10 to 20 milligrams per liter of cow's milk, (b) guanosine 5'-monophosphate in the amount of 0.2 to 0.4 milligram per liter of cow's milk, (c) uridine 5'-monophosphate in the amount of 1.2 to 1.4 milligrams per liter of cow's milk, (d) guanosine 5'-diphosphate in the amount of 0.4 to 0.6 milligram per liter of cow's milk, (e) uridine 5'-diphosphate glucose in the amount of 0.5 to 1.0 milligram per liter of cow's milk, (f) uridine 5'-diphosphate galactose in the amount of 0.5 to 1.0 milligram per liter of cow's milk and (g) uridine 5'-diphosphate glucuronic acid.

References Cited by the Examiner
UNITED STATES PATENTS

| | | | |
|---|---|---|---|
| 2,641,547 | 6/1953 | Evans | 99—124 X |
| 2,860,051 | 11/1958 | Krehl et al. | 99—54 |
| 3,104,171 | 9/1963 | Sakaguchi et al. | 99—140 |
| 3,120,511 | 2/1964 | Tanaka et al. | 99—140 X |

OTHER REFERENCES

Winton et al.: "Structure and Composition of Foods," vol. III, New York, 1937, publ. by John Wiley & Sons, Inc., p. 284.

A. LOUIS MONACELL, *Primary Examiner.*

TOBIAS E. LEVOW, *Examiner.*